March 9, 1926.
J. W. BRUNDAGE
RUBBER TRIMMING DEVICE
Filed August 3, 1925
1,575,616
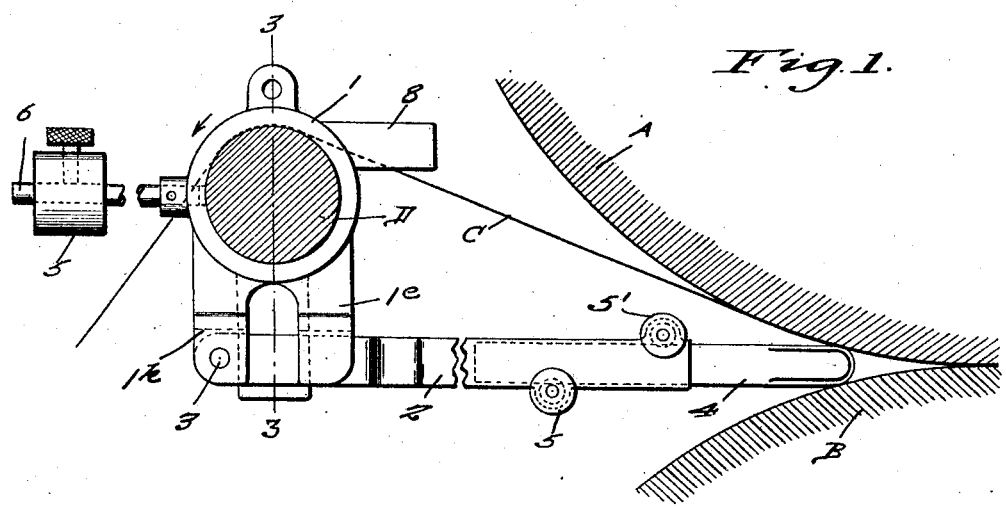
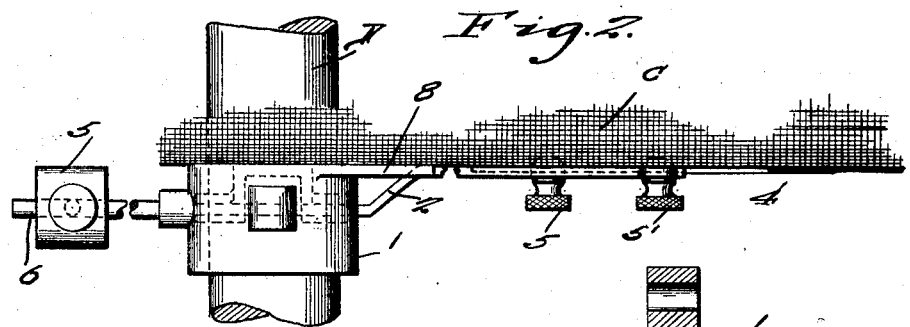
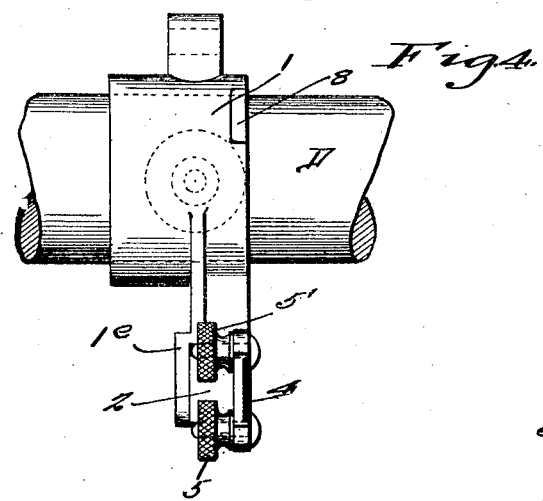
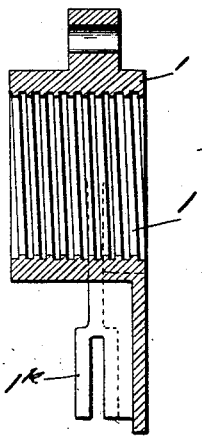
Inventor
James W. Brundage
By Spear, Middleton,
Donaldson & Hall
Attorney Patented Mar. 9, 1926.

1,575,616

UNITED STATES PATENT OFFICE.

JAMES W. BRUNDAGE, OF AKRON, OHIO, ASSIGNOR TO THE MILLER RUBBER COMPANY, OF AKRON, OHIO, A CORPORATION OF OHIO.

RUBBER-TRIMMING DEVICE.

Application filed August 3, 1925. Serial No. 47,831.

*To all whom it may concern:*

Be it known that I, JAMES W. BRUNDAGE, a citizen of the United States, and resident of Akron, in the county of Summit and State of Ohio, have invented certain new and useful Improvements in Rubber-Trimming Devices, of which the following is a specification.

My present invention relates to an improved means for trimming the surplus rubber stock from the edges of rubber coated fabric strips such as are used in the formation of numerous articles of fabric and rubber. Such rubber coated strips are produced, as is well known, by passing a fabric strip or web between coacting rolls of a calender having the same or differential speed according to the nature of the material to be produced, rubber being at the same time applied, which is spread by the rolls and applied in the form of a film or layer to the surface of the fabric. The rubber tends necessarily to spread beyond the edge of the fabric and requires to be trimmed off.

The present invention aims to provide a trimming knife or knives which will automatically trim the surplus rubber at the exact edge of the fabric and which will follow the edge of the fabric closely and conform to any irregularities thereof without any tendency to cut or injure the fabric.

To this end the invention comprises the novel construction and arrangement and combination of parts hereinafter described, the nature and scope of the invention being defined by the claims appended hereto.

An embodiment of my invention is illustrated in the accompanying drawings, in which:—

Figure 1 is a side elevation showing a portion of two cooperating calender rolls with my improved trimming means applied thereto.

Fig. 2 is a horizontal fragmentary plan view.

Fig. 3 is a section on line 3—3 of Fig. 1.

Fig. 4 is a detailed elevation of the bracket or knife holder looked at from the direction of the calender rolls.

Referring by reference characters to this drawing, the letters A and B indicate a pair of coacting calender rolls, but as the calender may be of the ordinary or any desired construction well known to those skilled in the art, illustration of more than portions of the rolls is deemed unnecessary.

The coated fabric strip issuing from the bight of the rolls is indicated at C and it is passed over a guide roll D from which it may be led to any desired point.

I have discovered that if a trimming knife is movably supported by a bracket having an internally threaded hub which is mounted on a smooth surfaced rotating shaft portion so as to be capable of rotary and axial movement thereof, and the cutting edge of the knife is caused to impinge against the rubber at the edge of the fabric on one of the calender rolls constituting as it were a platen roll, the screw threads acting on the rotating shaft portion will tend to urge the knife towards the edge of the fabric with an action which will be so delicate that the knife will accurately follow and be guided by the edge of the fabric, irrespective of any deviations thereof from a straight line, and hence the surplus rubber will be trimmed exactly at the edge of the fabric without any danger of cutting or injuring the latter.

The guide roll D which is an idle roll, may be used as the support for the knife, in which event the guide roll is rotated by the passage of the fabric thereover. If the guide roll is of the proper size and in the shape of a smooth steel roller as is customary, a portion of the roller adjacent one edge of the fabric may be used as the supporting means for the knife.

This supporting means comprises a bracket 1, having its hub provided with internal screw threads indicated at 1ª, the direction of the screw threads being such that the rotation of the guide roll in the direction of the arrow tends to move the hub axially of the guide roll towards the edge of the fabric. A knife carrier 2 has its rear end pivotally connected at 3 between a pair of lugs 1ᵏ on the under side of the hub, the knife carrier being thereby mounted to swing in a vertical plane and being guided in such plane by the guide fork 1ᵉ. A trimming knife 4 is removably supported by the knife holder by clamp screws 5, 5′, and its forward end enters the bight of the rolls and impinges against the roll A, which constitutes a platen roll so far as the action of the knife is concerned.

A weight 5, adjustably mounted on arm 6, tends to rock the bracket about the shaft and thus thrust the knife 4 into the bight of the calender rolls with a wedging action. The bracket may be provided with a fabric guide indicated at 8.

While in the present drawings I have, for convenience, illustrated the knife and supporting mechanism at one edge of the fabric, it will be understood that in practice this mechanism would be duplicated for coaction with the opposite edge of the fabric, the only difference being that the internal threads of the hub would be reversed as to inclination.

Having thus described my invention, what I claim is:—

1. The combination with means for applying rubber coatings to fabric strips, including a rotating platen member, of a rotating shaft member, a bracket member having an internally threaded hub mounted upon a smooth portion of said shaft member, a trimming knife cooperating with said platen member, and means for causing said knife to be pressed against the platen member.

2. The combination with a calender for applying rubber coating to fabric strips, of means for trimming the rubber at one edge of the fabric, comprising a smooth surfaced shaft adjacent one of the calender rolls, and arranged to be driven coincidentally with said roll, a bracket having an internally threaded hub freely movable on said shaft, means tending to rock said bracket on said shaft, and a knife carried by said bracket and impinging against said calender roll.

3. The combination with a pair of calender rolls for applying rubber coating to fabric strips, of means for trimming the excess rubber at the edge of a strip, comprising an idle roll adjacent the bight of the calender rolls over which the coated fabric passes, said idle roll having a smooth cylindrical portion, a bracket having an internally threaded hub freely movable on said cylindrical portion, means tending to rotate said bracket on said smooth cylindrical portion, and a knife carried by said bracket and impinging against a calender roll.

4. The combination with a pair of calender rolls for applying rubber coating to fabric strips, of means for trimming the excess rubber at the edge of a strip, comprising an idle roll adjacent the bight of the calender rolls over which the coated fabric passes, said idle roll having a smooth cylindrical portion, a bracket having an internally threaded hub freely movable on said cylindrical portion, means tending to rotate said bracket on said smooth cylindrical portion, and a knife having its rear end pivotally connected with said bracket and its front end engaging the bight of the calender rolls.

5. The combination with a pair of calender rolls for applying rubber coating to fabric strips, of means for trimming the excess rubber at the edge of a strip, comprising an idle roll adjacent the bight of the calender rolls over which the coated fabric passes, said idle roll having a smooth cylindrical portion, a bracket having an internally threaded hub freely movable on said smooth cylindrical portion, means tending to rotate said bracket on said smooth roll portion, a knife carrier having its rear end pivotally connected to said bracket to swing in a plane perpendicular to the axes of the calender rolls, a guide fork on said bracket for preventing side play of the knife carrier, and a trimming knife carried by said carrier and engaging the bight of the rolls.

In testimony whereof, I affix my signature.

JAMES W. BRUNDAGE.